W. H. WILLARD.
Plow-Colter
No. 37,065.  Patented Dec. 2, 1862.
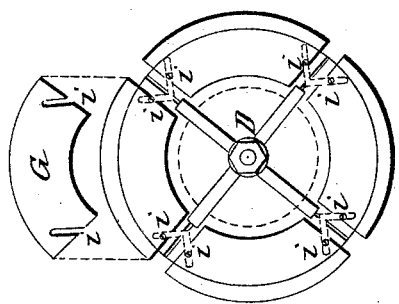
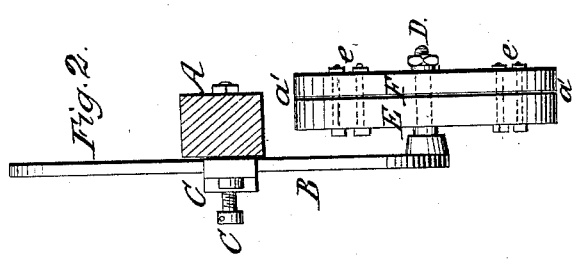
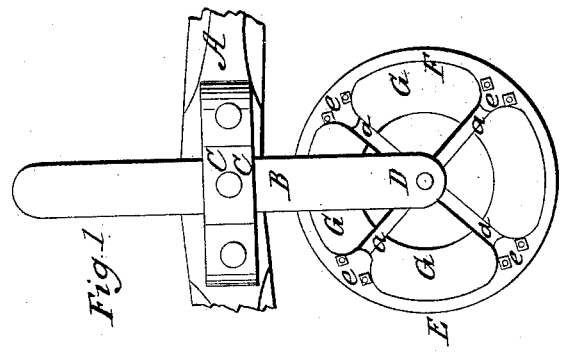
Witnesses.  Inventor.

UNITED STATES PATENT OFFICE.

W. H. WILLARD, OF CLEVELAND, OHIO.

IMPROVED REVOLVING EXTENSION-COLTER AND GAGE-WHEEL COMBINED.

Specification forming part of Letters Patent No. 37,065, dated December 2, 1862.

*To all whom it may concern:*

Be it known that I, W. H. WILLARD, of Cleveland, in the county of Cuyahoga and State of Ohio, have invented new and useful Improvements in Combined Extension Revolving Colter and Gage-Wheel for Plows; and I do hereby declare that the following is a full and complete description of the construction and operation of the same, reference being had to the accompanying drawings, making part of this specification, in which—

Figure 1 is a side view, Fig. 2 is a front view, and Fig. 3 is a sectional view, of the wheel, showing the extension-colters.

Like letters refer to like parts in the several views.

The points of novelty in this improvement consist in combining a revolving extension-colter with a gage-wheel, to be attached to the beam of plows in the usual manner.

A is the plow-beam.

B is an arm, which is secured to the plow-beam in such a manner, by means of the cap C and set-screw C', that it can be adjusted vertically.

D is an axle, upon which the wheel E revolves. Thus far the arrangement is similar to the ordinary gage-wheel on plows. The rim E of the wheel is cast in two parts and separates at $a$ $a'$, Figs. 1 and 2. The detachable portion of the rim F is secured in place, as seen in Figs. 1 and 2, by the bolts and nuts $e$. The revolving extension-colters G, Fig. 3, (shown also in Fig. 1, but not extended,) consist of four steel plates with slots $i$, that slide upon the bar of the bolts $e$, so that the colters G can be extended beyond the circumference of the wheel E one, two, or three inches; or different sets of blades may be made which extend to any desired distance beyond the face of the wheel. These segmental blades G are secured in any desired position, as seen by the dotted lines in Fig. 3, by screwing up the nuts on the bolts $e$, and thus clamping the segments between the two portions of the rim E F. When the blades are drawn in even with the face of the wheel the wheel simply acts as a gage-wheel for the plow.

In breaking up sward-ground, where a colter is needed, the blades G are extended, as seen in Fig. 3, to the desired extent and secured as above stated. The segments G may be so constructed, as regards length, as to form a continuous blade without openings between the segments.

The advantages of this form of colter are twofold: First, it takes less draft than the stationary one; second, where stalks or stubble lie upon the ground a line of separation is made without clogging, and the stubble is thus turned under and neatly covered.

What I claim as my improvement, and desire to secure by Letters Patent, is—

A gage-wheel and revolving extension-colter constructed and operating substantially as and for the purpose specified.

W. H. WILLARD.

Witnesses:
W. H. BURRIDGE,
J. BRAINERD.